US008706760B2

(12) United States Patent
Edelstein et al.

(10) Patent No.: US 8,706,760 B2
(45) Date of Patent: Apr. 22, 2014

(54) METHOD TO DELAY LOCKING OF SERVER FILES ON EDIT

(75) Inventors: Noah Edelstein, Seattle, WA (US); Hai Liu, Redmond, WA (US); Hani Saliba, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 194 days.

(21) Appl. No.: 10/376,716

(22) Filed: Feb. 28, 2003

(65) Prior Publication Data
US 2004/0172395 A1 Sep. 2, 2004

(51) Int. Cl.
*G06F 7/00* (2006.01)
*G06F 17/30* (2006.01)

(52) U.S. Cl.
USPC ........................................................ 707/781

(58) Field of Classification Search
USPC ............. 707/9, 8, 10, 201, 781, 782; 713/165
See application file for complete search history.

(56) References Cited

U.S. PATENT DOCUMENTS

| | | | | |
|---|---|---|---|---|
| 5,566,319 A * | 10/1996 | Lenz | ............................. | 711/147 |
| 5,615,373 A * | 3/1997 | Ho | ............................... | 710/200 |
| 5,649,200 A * | 7/1997 | Leblang et al. | ................ | 717/122 |
| 5,678,040 A * | 10/1997 | Vasudevan et al. | ..................... | 1/1 |
| 5,761,498 A | 6/1998 | Ooe et al. | ....................... | 395/610 |
| 5,774,717 A * | 6/1998 | Porcaro | ......................... | 707/202 |
| 5,799,320 A * | 8/1998 | Klug | ............................. | 707/201 |
| 5,892,954 A * | 4/1999 | Tomas et al. | ................... | 710/200 |
| 5,978,802 A * | 11/1999 | Hurvig | ........................... | 710/200 |
| 5,983,277 A * | 11/1999 | Heile et al. | ..................... | 709/232 |
| 6,067,551 A * | 5/2000 | Brown et al. | ................... | 707/203 |
| 6,073,161 A * | 6/2000 | DeBoskey et al. | ............. | 709/200 |
| 6,076,105 A * | 6/2000 | Wolff et al. | ..................... | 709/223 |
| 6,081,807 A * | 6/2000 | Story et al. | ..................... | 707/101 |
| 6,094,659 A * | 7/2000 | Bhatia | ........................... | 375/222 |
| 6,151,609 A * | 11/2000 | Truong | ........................... | 715/205 |
| 6,240,414 B1 * | 5/2001 | Beizer et al. | ........................... | 1/1 |
| 6,343,301 B1 * | 1/2002 | Halt et al. | ............................. | 1/1 |
| 6,349,327 B1 | 2/2002 | Tang et al. | | |

(Continued)

FOREIGN PATENT DOCUMENTS

| | | |
|---|---|---|
| CN | 1330327 | 1/2002 |
| JP | 03040042 | 2/1991 |
| JP | 11096209 | 4/1999 |
| TW | 473661 | 1/2002 |

OTHER PUBLICATIONS http://www.lawlibrary.state.mt.us/en-us/Help/quickref.html Xerox Corporation, Last accessed Aug. 17, 2005.*

(Continued)

*Primary Examiner* — Robert Beausoliel, Jr.
*Assistant Examiner* — Michael Pham
(74) *Attorney, Agent, or Firm* — Tom Wong; Jim Ross; Micky Minhas

(57) ABSTRACT

A server is implemented with a modified file open action, which, when a user performs the modified open, initially opens a file without locking the file. When a user indicates (either explicitly or implicitly) that the user is attempting to or intending to open the file, the file can then be locked for editing. In this way, the default action when a user requests a file is to open the file without denying other users access to the file. Then, when the user indicates that editing should occur, the lock for the file is obtained.

3 Claims, 4 Drawing Sheets

(56) References Cited

U.S. PATENT DOCUMENTS

| | | | |
|---|---|---|---|
| 6,393,419 B1* | 5/2002 | Novak et al. | 707/8 |
| 6,393,437 B1* | 5/2002 | Zinda et al. | 707/201 |
| 6,405,225 B1* | 6/2002 | Apfel et al. | 715/210 |
| 6,446,088 B1 | 9/2002 | Vaduvur et al. | 707/201 |
| 6,529,905 B1* | 3/2003 | Bray et al. | 707/8 |
| 6,535,893 B1* | 3/2003 | Friske et al. | 1/1 |
| 6,760,840 B1* | 7/2004 | Shimbo et al. | 713/165 |
| 6,801,911 B1* | 10/2004 | Berstis | 707/10 |
| 6,993,713 B2* | 1/2006 | Wendt | 715/223 |
| 7,051,031 B2* | 5/2006 | Schein | 707/697 |
| 7,222,291 B2* | 5/2007 | Estrada et al. | 715/201 |
| 7,249,314 B2* | 7/2007 | Walker et al. | 715/205 |
| 7,293,097 B2* | 11/2007 | Borr | 709/229 |
| 7,398,323 B1* | 7/2008 | Gerraty et al. | 709/242 |
| 7,484,183 B2* | 1/2009 | Look et al. | 715/839 |
| 7,897,781 B2* | 3/2011 | Colburn et al. | 548/113 |
| 2002/0143691 A1* | 10/2002 | Ramaley et al. | 705/37 |
| 2003/0131332 A1* | 7/2003 | Pfeil et al. | 716/11 |
| 2003/0225764 A1* | 12/2003 | Smith et al. | 707/9 |
| 2004/0068505 A1* | 4/2004 | Lee et al. | 707/100 |

OTHER PUBLICATIONS http://www.linuxgazette.com/issue66/sharma.html Kapil Sharma, Last accessed Aug. 17, 2005☐☐.*

Spectrum SCM User Guide, SpectrumSCm Version 1.1, "Version Control and Source File Management", Jun. 2002.*

Xerox Corporation. "Using Xerox DocuShare 2.1". Xerox Corporation. (http://www.cotr.bc.ca/Docushare/en-us/Help/manual/dsman.htm) copyright 1997-99.*

Tanaka Tsutome et. al. "Document Creation Device". Oct. 29, 1991. Japanese Patent Office. pp. 1-21. (translation of Application No. 199040700).*

Agrawal, D., "Using Delayed Commitment in Locking Protocols for Real-Time Databases", *International Conference on Management of Data, Proceedings of the 1982 ACM SIGMOD International Conference on Management of Data*, 1992, 104-113.

Agrawal, D. et al., "Ordered Shared Locks for Real-Time Databases", *The VLDB Journal—The International Journal on Very Large Data Bases*, 1995, 4(1), 87-126.

Al-Houmaily, Y.J. et al., "1-2PC:The One-Two Phase Atomic Commit Protocol", *Symposium on Applied Computing, Proceedings of the 2004 ACM Symposium on Applied Computing*, 2004, 684-691.

West, M.J., "VICE File System Services", *Technical Report*, http://reports-archive.adm.cs.cmu.edu, 1984, 1-36, XP-002310766.

TW Application No. 093104829: Taiwan Search Report, Jun. 13, 2010, 1 page.

"Using Xerox DocuShare 2.2", Xerox Corporation, 2000, 132 pages.

* cited by examiner

METHOD TO DELAY LOCKING OF SERVER FILES ON EDIT

FIELD OF THE INVENTION

This invention relates to the field of document management, and in particular to a method and system for delaying the locking of server files being accessed by a user.

BACKGROUND OF THE INVENTION

Server computers such as web servers can perform double duty. A server can be used as a publishing location, where a user can access content. A server can also be used as a collaboration environment, where two or more users can collaborate on a document. Each user may update or otherwise edit the document. When a server is used as a publishing location, it can deliver an individual copy of a file to any user who requests the file, maintaining the version on the server without changes. When a server is used as a collaboration environment, it can allow a user who wishes to edit the file access to the most recent copy. Often, however, a server is used for both of these purposes at once, supporting both a publishing and a collaboration functions.

Such a dual-use creates a problem. For example, if the server is a web-server, the default mechanism for accessing a file on a web server (by following a hyper-link) will do only one of two actions. Depending on the hyper-link and web server, either clicking on the hyper-link will create a copy of the file that the user can read without altering the original file or clicking on the hyper-link will open the file on the server and allow the user to edit the file. When a file is opened for editing, it is locked, and no other users are allowed to edit the file.

Generally, a file may be opened with varying permissions granted to the user opening the file. When opening the file for reading, the file is opened read-only, which allows the user to read/browse or otherwise view or use the data in the file, as long as the data is not changed. When opening for editing, the file is opened read/write, which allows the user the same privileges, but also allows the user to modify the data or append to it. When a file is opened read/write, the file is locked. This locking ensures that only one user is modifying the file at a time, preventing conflicting modifications by two or more users.

The problem arises when the default-action is not what the user desires. For example, if the user wishes to edit the file, if the default is opening a copy for reading, the desired functionality for the user is not provided. Similarly, if the default is opening the file for editing, but the user wished only to read the file, the file is locked and another user who wishes to edit the file will be locked out from editing the file. A user who opens the file for reading and then wishes to edit the file must exit the file and then reopen it for editing.

SUMMARY OF THE INVENTION

A server is implemented with a modified file open action, which, when a user performs the modified open, initially opens a file without locking the file. When a user indicates (either explicitly or implicitly) that the user is attempting to or intending to open the file, the file can then be locked for editing. In this way, the default action when a user requests a file is to open the file without denying other users access to the file. Then, when the user indicates that editing should occur, the lock for the file is obtained.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

In order to allow flexibility when a user opens a document on a shared server, a modified open is implemented. When the modified open is used to open a file, the file is opened read-only. Only when and if the user that has opened the file using the modified open indicates that an edit to the file should be made is the lock on the file obtained, making the file read/write for the user, and locking any other users out of obtaining editing privileges for that file.

Exemplary Computing Device

Figure 1:
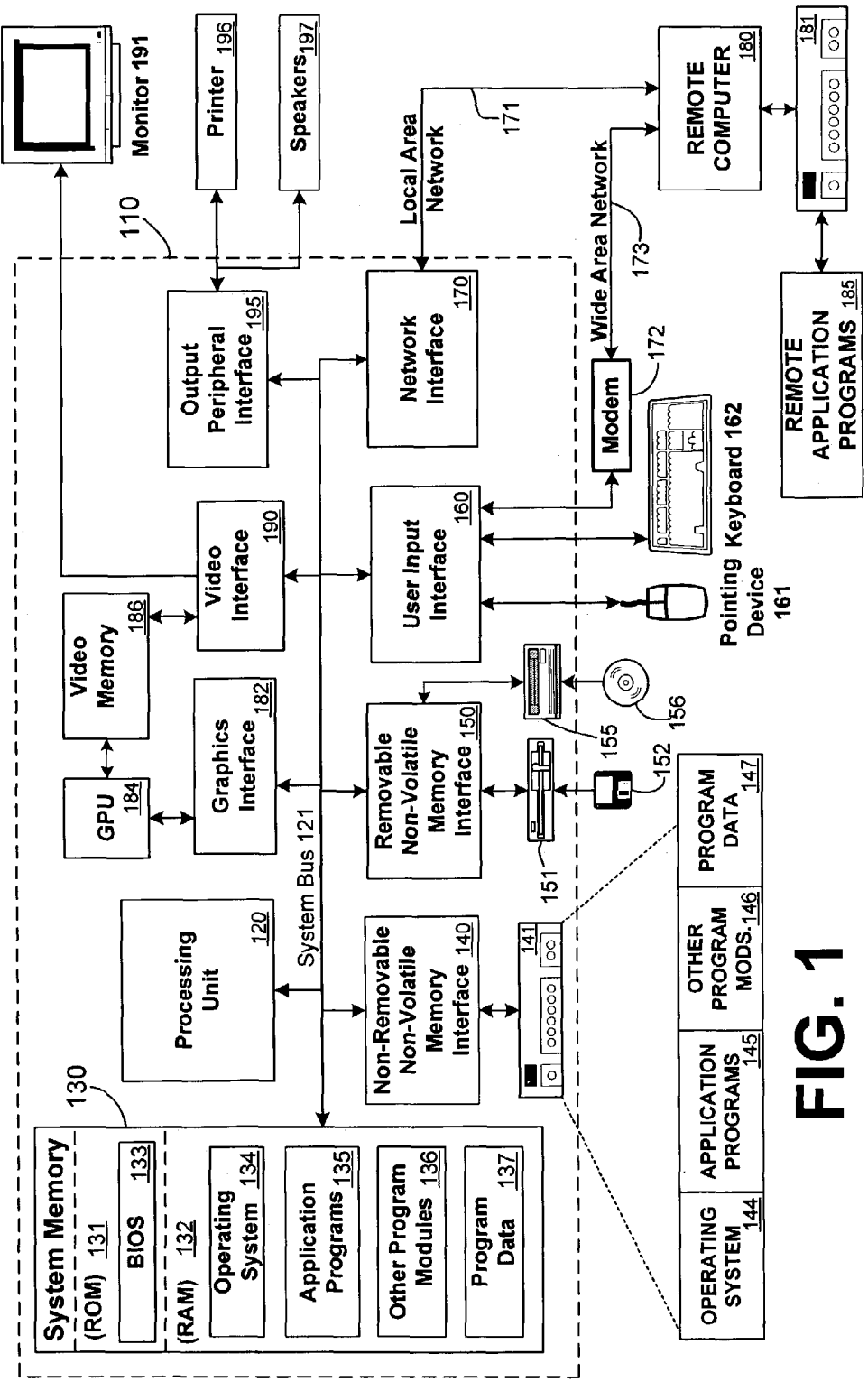
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of NET's languages and services, and in other distributed computing frameworks as well.

Delaying Locking

Figure 2:
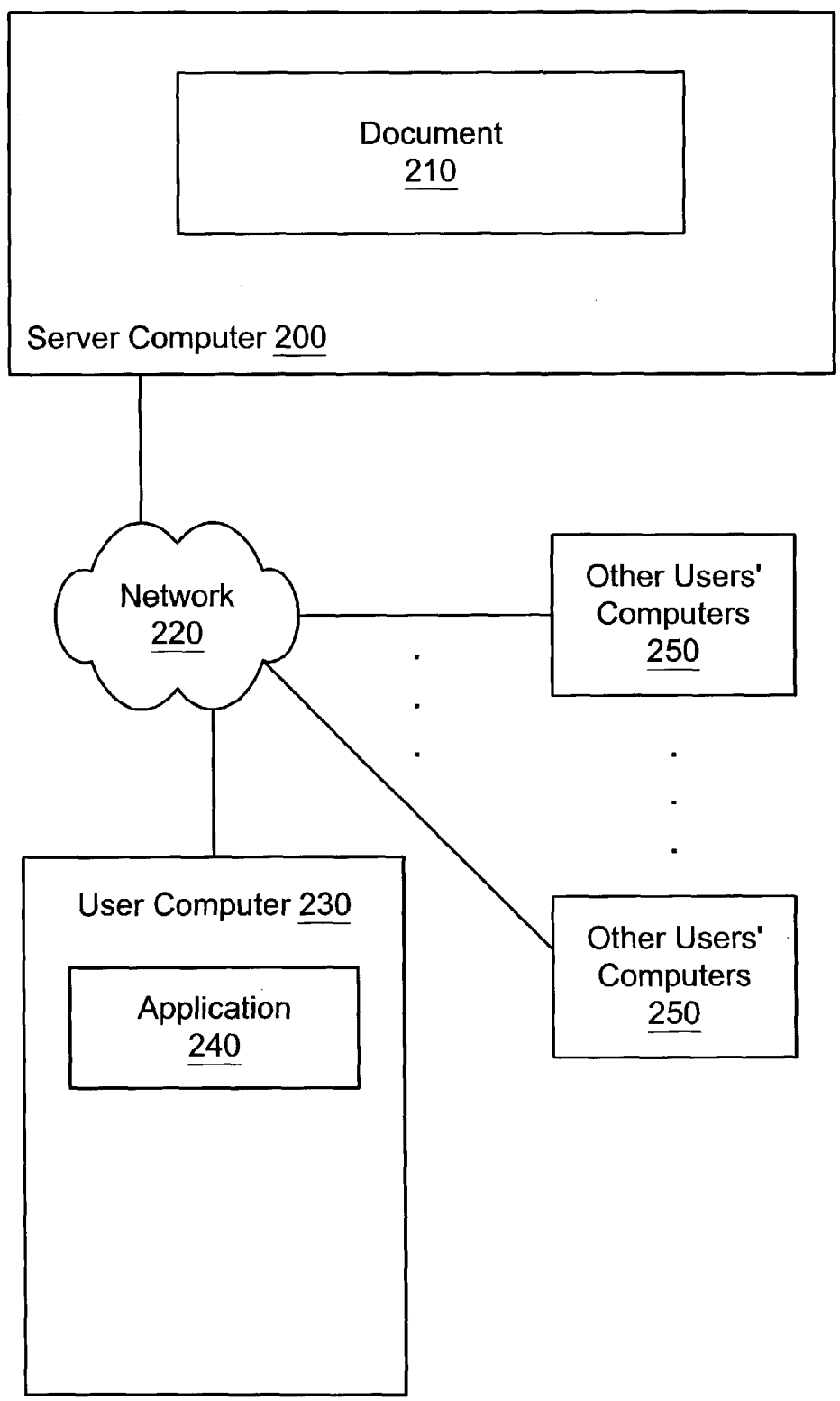
FIG. 2 is a functional diagram illustrating an example of a relationship between a server computer, a network, a user computer, and other computers.

With reference to FIG. 2, a file 210 resides on a server computer 200. A user with permissions for makes a request to open the file. The user may be connected to the server computer in a number of ways. For example, the user may connect directly, via a local area network (LAN), or remotely via a network such as the Internet. In the exemplary FIG. 2, user computer 230 is connected via network 220 to the server computer 200. Additionally, other users' computers are connected via network 220 to the server computer 200.

The user requests that the file be opened. One possible method of submitting such a request is by selecting a hyperlink on a web page served by the server computer 200. When the request is received by the server, the server allows the user computer 230 to open the file. The file is opened on the user's computer by an application 240. For example, this application may be a word processing application, a spreadsheet application, an audio player application, or any application by which a user may utilize the data being downloaded. In one embodiment, the user selects a hyperlink in a webpage being viewed in a web browsing application on the user computer 230, and the web browsing application opens the file with the appropriate application.

When the file is opened, in one embodiment, a copy of the file is made in the user computer 230's cache. It is the copy on the server computer 200 which the user browses or reads (or otherwise interacts with—e.g. by playing it in an audio player if the file includes audio data.) When the file is initially opened, the file is opened with "read-only" permissions. In this way more than one user may access the file and use it.

In an alternate embodiment, instead of a local copy being made in user computer 230, all users with read-only permissions are viewing the file on the server.

Locking of the file only occurs upon an indication that the user intends to edit the file. The lock would allow the user to have "read/write" permissions on the file. The user could then modify or append file data.

This intent to edit indication may be one of a number of different things. In one embodiment, the intent to edit is indicated by the user modifying the file in any way. In another embodiment, the intent to edit is indicated by the user. This may occur through a specialized "edit" command incorporated into the application, or when the user requests that changes already made be saved. In another embodiment, the intent to edit determination is a determination that the user has had said file open for a pre-specified period of time. For example, if the user has had the file open in read-only mode for ten minutes, it may be inferred that the user intends to edit the file.

In one embodiment, when the lock is obtained, a determination is made whether the copy of the file in the user computer 230's cache is the same version as the version currently on the server. This is to ensure that edits have not occurred in the interim. For example, User A opens a first version of the file, but does not demonstrate an intent to edit (and therefore does not trigger a lock). If User A then triggers the locking by demonstrating an intent to edit, it must be ensured that the version of the file currently on the server is the same as that which User A is viewing and intending to edit. If User B has opened and modified the file on the server computer 200 at some point between User A's opening of the file and User A's demonstration of an intent to edit, a conflict may occur. Conflict resolution options should be presented to the user.

For example, User A may have made substantial changes to the file, and may decide that the changes should supplant any changes that have occurred in the interim. The version on the user computer 230 is then written to the server computer 200 as file 210, and the file is locked so that User A has read/write privileges. Alternatively, User A may decide to save the version that User A is working on locally as another file, and reopen the file 210 on the server computer 200 for editing. Other conflict resolution options may also be presented to the user.

In order to determine whether the copy of the file in user computer 230 is the same version as the version of the file 210 currently on the server, version information may be stored and compared. This may include a version number, time and date saved information, or other version data. Alternatively, a full comparison may be made of the actual file 210 and the cached version in the user computer 230 to determine if the contents of the file are the same.

In an alternate embodiment where a user does not copy file 210 to user computer 230 but instead opens it directly from server computer 200, when the intent to edit triggering event occurs, the lock on editing file 210 is obtained for the user.

Figure 3:
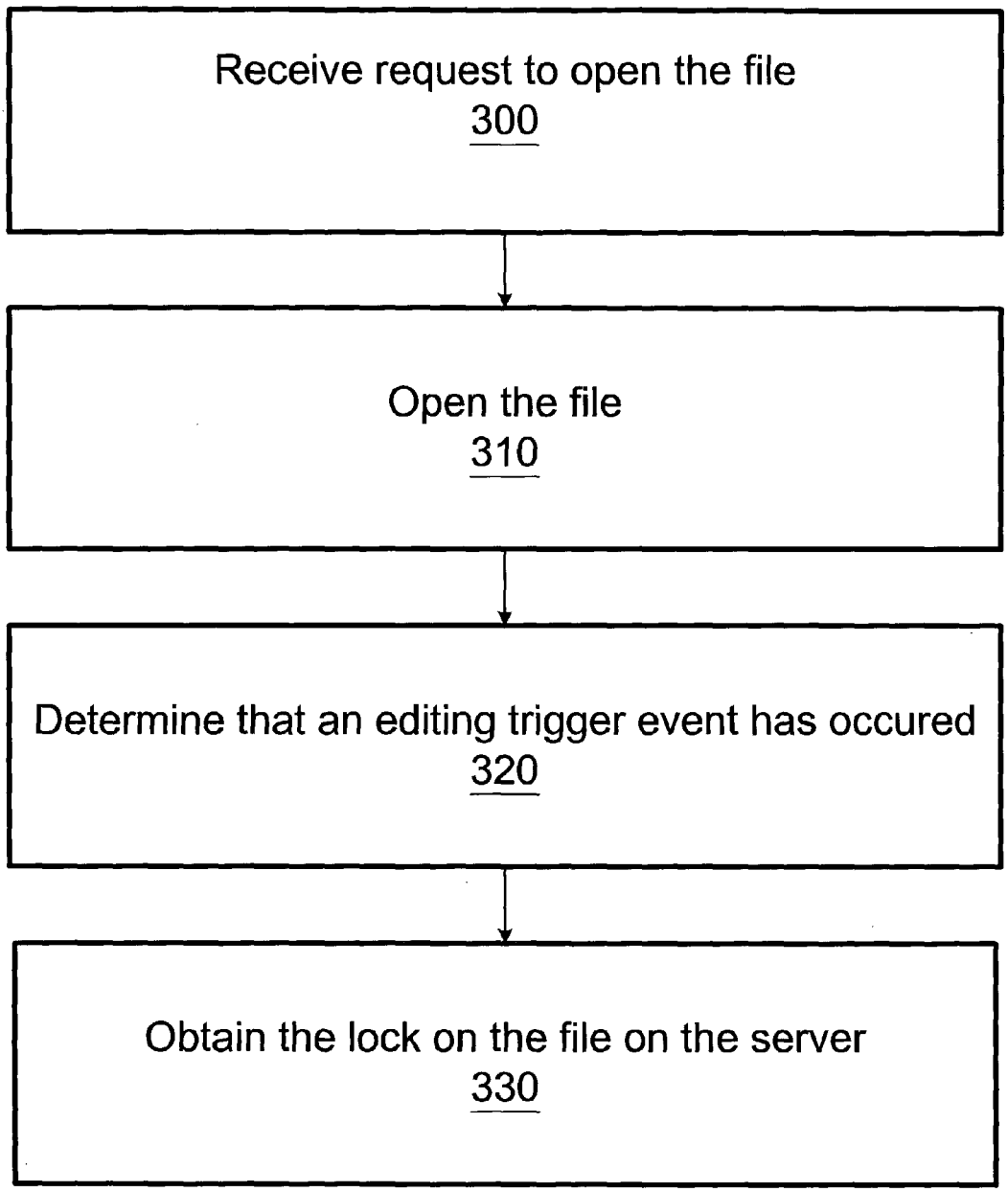
FIG. 3 is a flowchart showing delayed locking in accordance with one embodiment of the present invention.

As shown in FIG. 3, a request is received to open the file, in step 300. In step 310, the file is opened. In one embodiment, the file is opened directly from the server in read-only mode; in an alternate embodiment, a copy of the file is made and opened. In step 320, the determination is made that an editing trigger event has occurred. This editing trigger event may be the user saving changes to a local copy of the file, where one has been made. This editing trigger event may also be the user attempting to change the file, where the server copy of the file was opened read-only. This editing trigger event may also be that a predetermined period of time has elapsed, an "edit" indication received from a user, or any other event which necessitates the locking of the server file for editing.

In step 330, the lock is obtained on the file. This locks the server copy of the file for the user to modify without the possibility of conflicting modifications.

Figure 4:
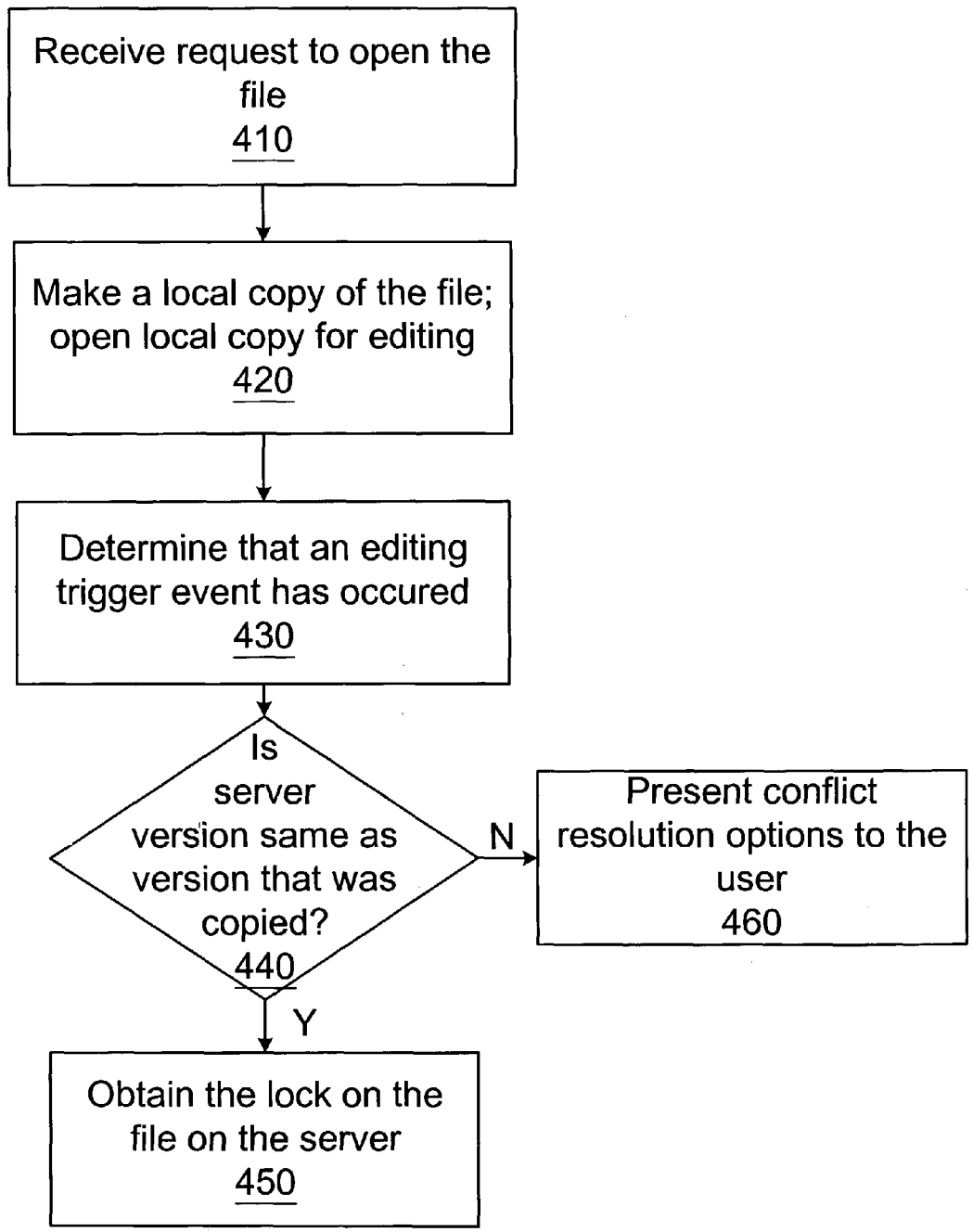
FIG. 4 is a flowchart showing delayed locking in accordance with an embodiment of the invention.

As shown in FIG. 4, conflict resolution may be implemented in one embodiment. As in FIG. 3, the first step 410 is when a request is received to open the file. In the second step 420 a local copy is made of the file, and that local copy is opened for editing. In the third step, 430, a determination is made that an editing trigger event has occurred. A comparison 440 is then made to determine whether the version of the file on the server is the same as the version which had been copied in step 420. If it is the same version, then the lock is obtained on the file, step 450. If the user has made changes to the local copy of the file, the server copy of the file may be updated to reflect those changes. If the version has changed, conflict resolution options are presented to the user in step 460. This may lead to the lock being obtained on the file, step 450, however, it may also lead to other conflict resolution options.

In this way, a file may be opened by a number of users simultaneously, who can all use the content of the file. However, when a user wishes to modify the file, the lock is then obtained for the user, and the user will have read/write privileges for the file.

CONCLUSION

As mentioned above, while exemplary embodiments of the present invention have been described in connection with various computing devices and network architectures, the underlying concepts may be applied to any computing device or system in which it is desirable to implement a modified file-open. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:
1. A method comprising:
receiving in a server computer, a request to open a server copy of a file, the request indicative of being originated from a first user computer, said server copy simultaneously accessed in a default read-only mode by a plurality of user computers, the plurality of user computers comprising said first user computer, wherein said server copy is retained in the default read-only mode;

in response to the request, using an application in said server computer to open said server copy in said server computer in a default read-only mode that allows granting of editing privileges to the plurality of user computers;

detecting an indication from the first user computer of an intent to edit said server copy in said server computer without making a local copy in said first user computer, the indication occurring after opening up the server copy to the plurality of user computers in the default read-only mode and the indication determining that the first user computer has had said server copy open in said default read-only mode for at least a pre-specified period of time; and upon determining that the pre-specified period of time has been equal or exceeded by the first user computer having the server copy open in said default read-only mode, changing said server copy from the default read-only mode to a read/write mode for the first user computer and locking out other computers of the plurality of user computers from obtaining editing privileges for said server copy while said server copy remains open by the first user computer for editing on said server computer.

2. A method comprising:

receiving, in a server computer, a request from a first user computer to open a file on the server computer;

in response to the request, using an application to open on the server computer, a server copy of said file in a default read-only mode, said server copy simultaneously accessed in the default read-only mode by a plurality of user computers, the plurality of user computers comprising said first user computer, wherein said server copy is retained in the default read-only mode;

determining, while the server copy of the file is open on the server computer, in the default read-only mode to the plurality of user computers, that the first user computer has had said server copy open in said default read-only mode for at least a pre specified period of time, and without making a local copy of said file in said first user computer; and in response to determining that the pre-specified period of time has been equal or exceeded by the first user computer having said server copy open in said default read-only mode, the server computer automatically changing the server copy of the file from the default read-only mode to a read/write mode for the first user computer and locking out other computers of the plurality of user computers from obtaining editing privileges for the file while said file remains open by the first user computer on the server computer in the read/write mode.

3. A non-transitory computer-readable storage medium, the non-transitory computer-readable storage medium having stored thereon computer-executable instructions that when executed by a server computer, cause performance of a method, the method comprising:

receiving in the server computer from a first user computer, a request from the first user computer to open a server copy of a file in the server computer, said server copy simultaneously accessed in a default read-only mode by a plurality of user computers, the plurality of user computers comprising said first user computer, wherein said server copy is retained in the default mode;

in response to the request, using an application to open said server copy in the server computer in a default read-only mode that allows granting of editing privileges to the plurality of user computers;

detecting an indication from the first user computer of an intent to edit said server copy in said server computer without making a local copy in said first user computer, the indication occurring after opening the server copy to the plurality of user computers and the indication determining that the first user computer has had said server copy open in said default read-only mode for at least a pre specified period of time; and upon determining the pre-specified period of time has been equal or exceeded by the first user computer having said server copy open in said default read-only mode, changing said server copy from the default read-only mode to a read/write mode for the first user computer and locking out other computers of the plurality of user computers from obtaining editing privileges for said server copy while said server copy remains open by the first user computer for editing on said server computer.

* * * * *